United States Patent [19]
Gray

[11] Patent Number: 5,680,404
[45] Date of Patent: Oct. 21, 1997

[54] CYCLING ERROR COUNT FOR LINK MAINTENANCE

[75] Inventor: Thomas Gray, Ontario, Canada

[73] Assignee: Mitel Corporation, Ontario, Canada

[21] Appl. No.: 460,733

[22] Filed: Jun. 2, 1995

Related U.S. Application Data

[63] Continuation of Ser. No. 870,663, Apr. 17, 1992, abandoned.

[30] Foreign Application Priority Data

Mar. 31, 1992 [CA] Canada ................... 2064541

[51] Int. Cl.[6] .................................................. G06F 11/00
[52] U.S. Cl. ................................................ 371/5.1; 371/68.2
[58] Field of Search ........................... 371/5.1, 8.2, 20.1, 371/20.6, 20.5, 37.7, 40.2, 68.2, 32, 33, 11.2, 20.4, 67.1; 395/182.16

[56] References Cited

U.S. PATENT DOCUMENTS

| | | | |
|---|---|---|---|
| 3,971,888 | 7/1976 | Ching et al. | 371/5.1 |
| 3,985,967 | 10/1976 | Colton et al. | 371/5.1 |
| 4,225,960 | 9/1980 | Masters | 371/5.1 |
| 4,291,403 | 9/1981 | Waddill et al. | 371/5.1 |
| 4,330,885 | 5/1982 | Abbott et al. | 370/17 |
| 4,354,267 | 10/1982 | Mori et al. | 371/11.1 |
| 4,387,461 | 6/1983 | Evans | 371/5.1 |
| 4,402,082 | 8/1983 | Cope | 371/221 |
| 4,661,953 | 4/1987 | Vsnkatesh et al. | 371/5.1 |
| 4,672,603 | 6/1987 | Conforti | 370/58 |
| 4,769,761 | 9/1988 | Downes et al. | 371/4 |
| 4,800,562 | 1/1989 | Hicks | 371/5.1 |
| 4,851,820 | 7/1989 | Fernandez | 371/5.1 |
| 4,970,714 | 11/1990 | Chen et al. | 370/17 |
| 4,970,718 | 11/1990 | Simcoe et al. | 371/5.1 |
| 5,023,872 | 6/1991 | Annamalai | 371/5.1 |
| 5,268,902 | 12/1993 | Onozaki | 370/94.1 |
| 5,271,000 | 12/1993 | Engbersen et al. | 370/13 |
| 5,305,316 | 4/1994 | Yoshida et al. | 370/85.1 |
| 5,331,642 | 7/1994 | Valley et al. | 371/5.2 |
| 5,335,233 | 8/1994 | Nagy | 371/32 |
| 5,357,517 | 10/1994 | Takebe | 371/5.1 |
| 5,361,255 | 11/1994 | Diaz et al. | 370/58.1 |
| 5,392,299 | 2/1995 | Rhines et al. | 371/37.5 |
| 5,481,563 | 1/1996 | Hamie | 375/226 |

*Primary Examiner*—Robert W. Beausoliel, Jr.
*Assistant Examiner*—Albert T. Decady
*Attorney, Agent, or Firm*—Antonelli, Terry, Stout & Kraus, LLP.

[57] ABSTRACT

A method of determining the reliability of data transmission system links is comprised of transmitting a data stream containing a data integrity sequence and at least one accumulated error count sequence along one of the links, determining the integrity of the data in the stream at the end of the link using the data integrity sequence, adding a count of data errors detected to the accumulated error count sequence, and periodically detecting the count as a measure of the reliability.

8 Claims, 2 Drawing Sheets

CYCLING ERROR COUNT FOR LINK MAINTENANCE

This application is a continuation application of Ser. No. 07/870,663, filed Apr. 17, 1992, now abandoned.

FIELD OF THE INVENTION

This invention relates to data transmission and in particular a method of determining the reliability of data transmission system links.

BACKGROUND TO THE INVENTION

Data transmission systems typically use copper or optical fiber links between transceivers, which links are subject to faults from time to time. Systems which utilize the links typically check the links for reliability.

One form of reliability checking, which has been extensively used in telephony, is to loop a link under test back to the transceiver performing the testing. Signals are transmitted outwardly along the link and are received back via the loopback link. A comparison of the transmitted and the loopback received signal provides an indication of the reliability of the link.

In a loopback process as described above, a processor is used to perform the signal comparison. Furthermore, the loopback process must occur at the time that errors are in existence, or else faults are missed. Consequently the loopback process must be performed relatively frequently. The use of the processor and the frequency of loopback introduces inefficiencies in the system, which is costly. Further, when the link is checked, it is out of service for other calls.

Another type of system provides a cyclic redundancy code (CRC) data sequence in the data stream. Processors at the ends of the link monitor the CRC sequence and exchange information about detected errors.

The efficiency of such systems is degraded because of the requirement to use processors at the ends of the link to monitor the CRC and to exchange messages about detected errors. Nevertheless since the CRC sequence is transmitted repetitively in the data stream, the process is much more likely than the loopback process to detect faults in the link.

SUMMARY OF THE PRESENT INVENTION

The present invention provides constant monitoring of the link, as frequently as the system using the CRC sequence, but greatly increases the efficiency of the system since processors are not required at each end of the link. In addition, the system can be used to check all of the links in a system to be described continuously.

The instance of link faults has been determined to be typically very infrequent. Therefore it has been found to be unnecessary to check for the instance of faults by means of processors at the ends of each link and to isolate the faulty links if the CRC does not check correctly. Instead, a count of the data errors determined using the CRC or other transmission error indicating (data integrity) sequence is maintained as part of the data stream. Periodically, at any rate preferred to be used the number of errors counted can be switched to a central monitoring station for detection. The detection, for example, can be when the number of faults reaches a certain number.

In general, an embodiment of the invention is a method of determining the reliability of data transmission system links comprised of transmitting a data stream containing a data integrity sequence and at least one accumulated error count sequence along one of the links, determining the integrity of the data in the stream at the end of the link using the data integrity sequence, adding a count of data errors detected to the accumulated error count sequence, and periodically detecting the count as a measure of the reliability.

Preferably the error count is comprised of an incoming data (ID) error count sequence and an outgoing data (OD) error count sequence, and including the steps of adding the count of data errors to the ID sequence, exchanging the ID and OD sequences in the data stream, and transmitting the data stream along an outgoing link.

It is also preferred that the at least one of the links and the outgoing link are a pair of transmission links passing through the optical fiber.

BRIEF INTRODUCTION TO THE DRAWINGS

A better understanding of the invention will be obtained by reference to the detailed description below, in conjunction with the following drawings, in which.

DETAILED DESCRIPTION OF THE INVENTION

Figure 1:
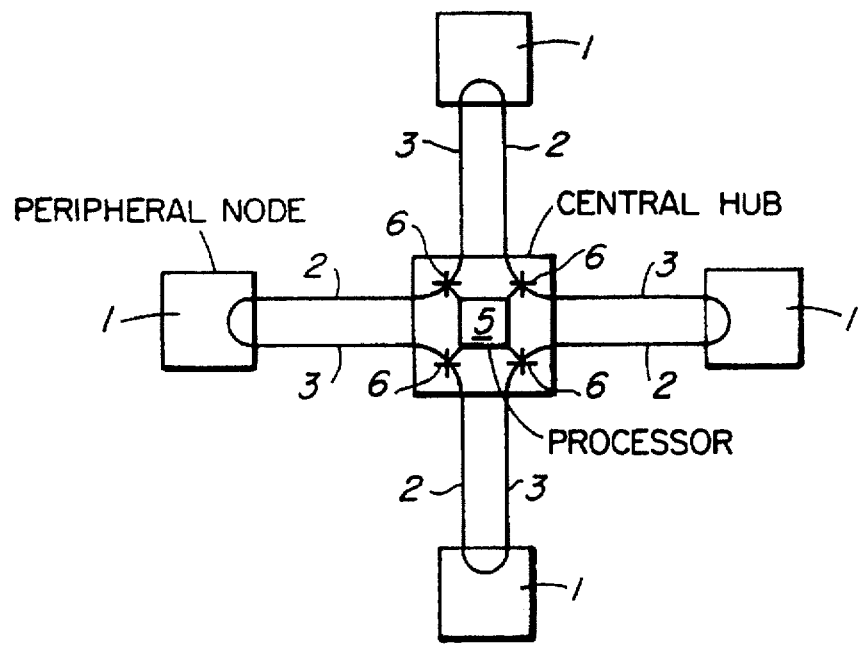
FIG. 1 is a block diagram of a system in which the present invention can be implemented.

Turning to FIG. 1, a representative system which utilizes links for transmission of data is illustrated. The system is comprised of peripheral nodes 1 connected via incoming and outgoing data transmission links 2 and 3 respectively. The transmission links are connected between the peripheral nodes and a central hub 4 which contains a processor 5. The processor 5 controls switches 6 to interconnect the transmission links in a loop.

Data is transmitted between peripheral nodes via the incoming and outgoing links in a data stream which is e.g. formed of trains or blocks of data, each train being formed of packets. In the case of a faulty link in a pair, the processor 6 can disconnect that pair of links and instead connect the remaining nodes in a loop, thus bypassing the faulty link or pair of links, or disconnect a single link and replace it with a redundant link. The processor can of course monitor the data being carried along the links.

The system described above is for illustration purposes only; the invention is not restricted thereto. The invention may alternatively be implemented in any form of system in which transmission links connect nodes to each other, e.g. a peripheral node to another node such as a central hub, to a peripheral control system, to another peripheral node, etc.

Figure 2:
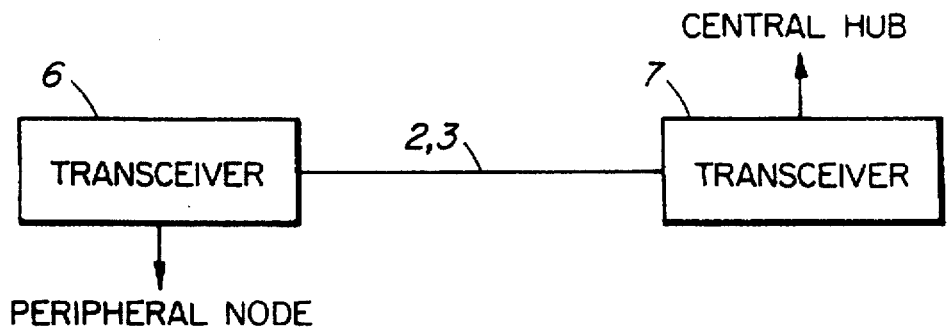
FIG. 2 is a block diagram of a pair of interconnected transceivers in which the invention is implemented.

Turning to FIG. 2, the transmission links 2, 3 are shown connected between a pair of transceivers 6 and 7, and carry data signals (data) between them. The transceivers are each connected to or are part of a unit at each respective end of the transmission links. For example transceiver 6 is connected to the peripheral node 1 and transceiver 7 is connected to the central hub 4 in the system described. Preferably the transmission links 2, 3 are constituted by a single two-way optical fiber which is wavelength divided, or by a pair of separate optical fibers. Such a link can typically run at 16 mb/s. However the invention is not restricted to optical fibers.

Figure 3:
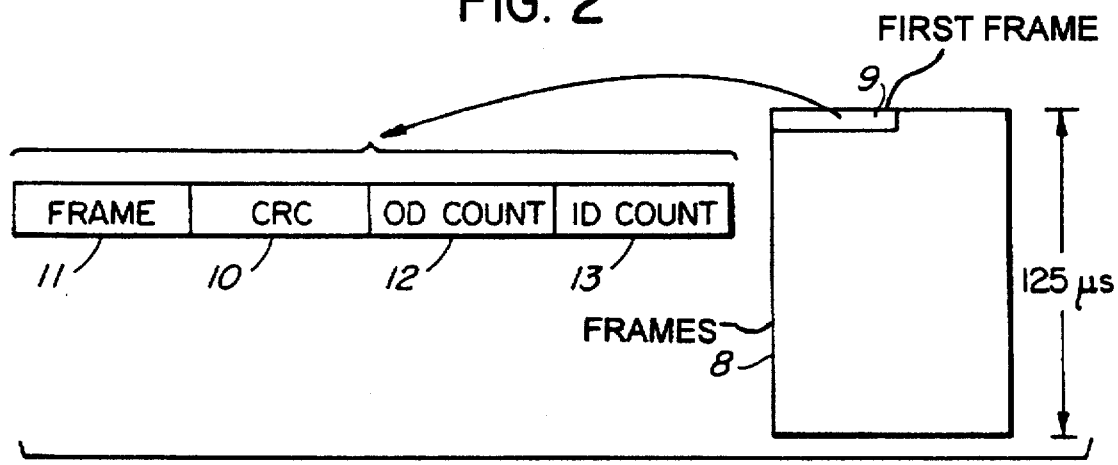
FIG. 3 illustrates the form of data transmitted between transceivers.

Turning to FIG. 3, a protocol of a data stream block 8 may repeat every 125 μs as in the example shown. FIG. 3 illustrates this group of frames in block 8 which repeats every 125 μs. A first frame 9 contains framing and overhead data which includes a CRC checksum 10 on the contents of the 125 μs block of data. The framing data is contained in the portion of the frame indicated as reference 11.

In accordance with the present invention the first frame also contains an outgoing data error count sequence OD COUNT 12 and an incoming data error count sequence ID COUNT 13.

On an incoming data transmission link 2, the transceiver calculates the CRC checksum across the frame data and compares it to the transmitted CRC checksum in the frame. If an error is found, the transceiver adds the count to the ID COUNT sequence 13.

The transceiver then interchanges the OD count sequence and ID count sequence in the first frame 9. The block of frames 8 is then transmitted on the outgoing link 3. The OD and ID COUNT sequences are interchanged, because the OD error count sequence designates the outgoing link 3 which is incoming to the transceiver at the other end of the link, e.g. at the central hub. Therefore the ID error count and OD error count sequences indicate the incoming and outgoing links respectively to the peripheral nodes in the embodiment of FIG. 1. If the embodiment of FIG. 1 is not used, then the ID and OD count sequences designate the fault tally on the incoming and outgoing links respectively for the system which it is used.

Thus the reversal accommodates the two directions of the links, allowing a processor to eventually check on the error count to distinguish between links. However, if desired, only a single error count may be maintained, representing all lines on which the data is carried.

In summary, a count is maintained for errors in operation of the fiber links. The receiving transceiver determines the errors, and a running tally of the errors is accumulated in the OD error count and ID error count sequences in the first frame 9 (which first frame represents an overhead frame).

Thus error counts circulate around the system. At a convenient time, the reliability of the system may be monitored by switching the channels containing the error counts to a central monitoring station, which may be the processor 5. Prior to that time, the use of a maintenance processor is not needed. At that time, maintenance, e.g. switching in or switching out affected links may be done. For example, in the system shown in FIG. 1, if there are four incoming and four outgoing links, and a severe fault count tally has been has been determined upon implementing a maintenance cycle, the central processor can switch the entire system to a redundant link which loops around the entire system, or it can perform diagnostic tests on each pair of links or on each incoming or outgoing link to determine which particular one is at fault, and then to either bypass it or to substitute a redundant link in its place.

It should be noted that the error detection circuitry may be any convenient and conventional circuitry. In a system such as this, in which faults may be random and infrequent, every error need not be detected, but instead only an indication of the general reliability of transmission links needs to be determined. Therefore the error detection process need only be stringent enough to identify a faulty link (not every faulty frame). Single bit parity, checksums or some forms of CRC sequence could be used. The selection will typically be made for cost reasons, since the single bit parity technique will detect only one-half of the errors, which is sufficient to detect a link which is beginning to fail.

Figure 4:
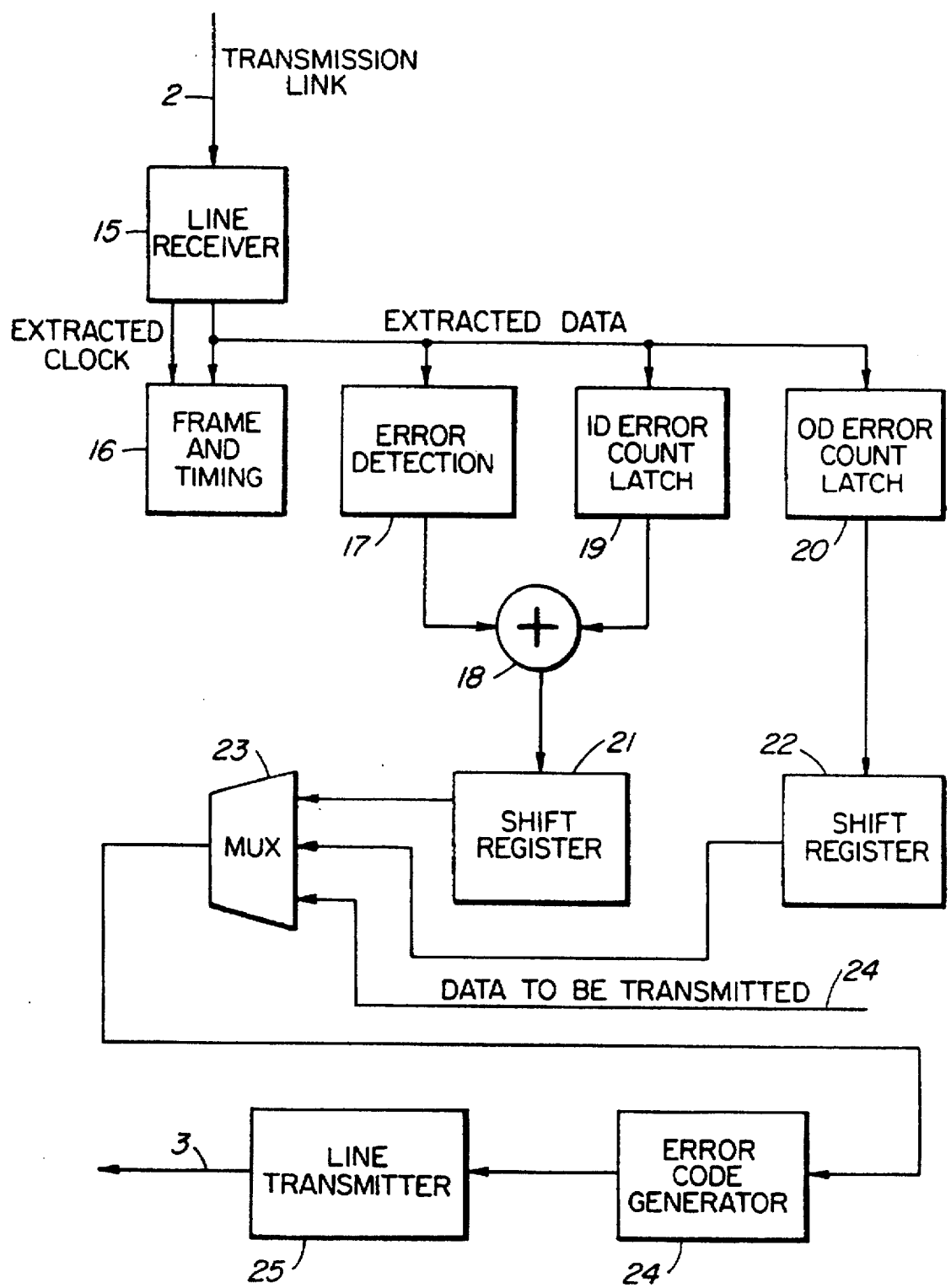
FIG. 4 is a detailed block diagram which may be used at each of the transceivers of FIG. 2.

FIG. 4 illustrates a block diagram of circuitry which is capable of implementing the cycling error count invention. The circuitry is designed to be symmetric and identical, and located at each end of the transmission link.

Data from e.g. transmission link 2 is received by line receiver 15. The receiver extracts data and clock information from the encoded data stream.

The clock data is applied to a frame and timing circuit 16, which detects frame synchronization in the data stream and produces proper timing signals for use by the rest of the circuit.

The extracted data from the line receiver 15 is applied to error detection circuit 17. The error detection circuit 17 detects errors in a well known manner, such as comparing the CRC received with the data with a calculated CRC determined with respect to the entire 125 μs incoming block of data. The resulting error count e.g. a "1" if an error has been detected in the previous frame and a "0" if it has not, is applied to an input of an adder 18.

The ID error count 13 in the data is extracted from the incoming data by latch 19, and the OD error count 12 is extracted from the incoming data by latch 20. The ID error count from latch 19 is also applied to adder 18 and that value, plus a count of additional errors from error detector 17 added in adder 18, results in a sum from adder 18 which is applied to shift register 21. The OD error count from latch 20 is applied to shift register 22.

The counts from shift register 21 and 22 are applied to serial multiplexer 23, along with the remaining data to be transmitted from line 24 from the node. The serial multiplexer 23 reverses the position of the count data. In other words the OD error count data from shift register 22, previously transmitted as sequence 12, now becomes transmitted as sequence 13, and ID error count sequence 13, now possibly incremented if errors have been detected, and presented to multiplexer 23 from shift register 21 becomes the ID error count sequence 12.

Because of this interchange of data, the error count circuitry is made independent of the end of the transmission link in which it is located.

The new outgoing data stream is applied from the output of multiplexer 23 to error code generator 24 which analyzes serially the outgoing data frame by frame and places an error checking code constituting a data integrity sequence (e.g. CRC) into the data stream at the appropriate place, e.g. in place of sequence 10.

Finally the data is applied to line transmitter 25 where the data and clock are combined by a suitable line code, and the line coded data is transmitted on the outgoing transmission link shown as 3.

A person understanding this invention may now conceive of alternative structures and embodiments or variations of the above. All of those which fall within the scope of the claims appended hereto are considered to be part of the present invention.

I claim:

1. A method of determining reliability of data transmission system links comprising the steps of: transmitting a data stream containing a data integrity sequence and at least one accumulated error count sequence along one of said links, determining the integrity of the data in said data stream at an end of said one of said links using the data integrity sequence, adding a count of data errors detected to the accumulated error count sequence, and periodically detecting said accumulated error count from the accumulated error count sequence as a measure of said reliability.

2. A method as defined in claim 1 wherein said accumulated error count is comprised of an incoming data (ID) error count sequence and an outgoing data (OD) error count sequence, and including the steps of adding said count of data errors to said ID error count sequence, exchanging the ID and OD error count sequences in said data stream, and transmitting said data stream along an outgoing link.

3. A method as defined in claim 2 in which said one of said links and said outgoing link are a pair of transmission links passing through a same optical fiber.

4. A method as defined in claim 1 in which the data integrity sequence is a cyclic redundancy check (CRC) sequence.

5. Data line link reliability apparatus comprising:
   (a) means for receiving an incoming data stream containing a data integrity sequence and at least one accumulated error count sequence,
   (b) means for checking errors in said data stream using the data integrity sequence,
   (c) means for adding a count of said errors to said accumulated error count to form a new accumulated error count,
   (d) means for recalculating the data integrity sequence,
   (e) means for transmitting an outgoing data stream with the new accumulated error count and the recalculated data integrity sequence, and
   (f) means for checking the new accumulated error count from time to time in a link maintenance procedure.

6. Apparatus as defined in claim 5 including means for receiving both an incoming and an outgoing error count sequence in said data stream, means for adding said count of said errors to said incoming error count sequence to form said new accumulated error count, means for replacing the outgoing error count sequence with said new accumulated error count, and means for replacing the incoming error count sequence with said outgoing error count sequence, whereby interchanged incoming and outgoing error count sequences result.

7. Apparatus as defined in claim 6 in which the incoming and outgoing data streams are received and transmitted respectively on separate optical fibers.

8. Apparatus as defined in claim 6 in which the incoming and outgoing data streams are received and transmitted respectively in separate links carried by a same optical fiber.

* * * * *